(12) United States Patent
Peterson et al.

(10) Patent No.: US 12,122,872 B2
(45) Date of Patent: Oct. 22, 2024

(54) COMPOSITION AND ARTICLE COMPRISING THE SAME

(71) Applicant: 3M INNOVATIVE PROPERTIES COMPANY, St. Paul, MN (US)

(72) Inventors: Jeffrey A. Peterson, Hugo, MN (US); Maria A. Appeaning, St. Paul, MN (US); Christopher P. Gerlach, Woodbury, MN (US); David J. Kinning, Woodbury, MN (US); Madison P. Bennett, Minneapolis, MN (US); Marie A. Boulos, West St. Paul, MN (US); Anna M. Clausen, Minneapolis, MN (US); Victor Ho, St. Paul, MN (US); Kevin T. Huseby, Oakdale, MN (US); Stephen A. Johnson, Woodbury, MN (US); Scott M. LeBow, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 623 days.

(21) Appl. No.: 17/433,950

(22) PCT Filed: Mar. 25, 2020

(86) PCT No.: PCT/IB2020/052802
§ 371 (c)(1),
(2) Date: Aug. 25, 2021

(87) PCT Pub. No.: WO2020/201921
PCT Pub. Date: Oct. 8, 2020

(65) Prior Publication Data
US 2022/0098363 A1   Mar. 31, 2022

Related U.S. Application Data

(60) Provisional application No. 62/825,964, filed on Mar. 29, 2019.

(51) Int. Cl.
| | | |
|---|---|---|
| *C08G 63/91* | (2006.01) | |
| *C08G 63/688* | (2006.01) | |
| *C08K 5/3492* | (2006.01) | |
| *C08K 5/5435* | (2006.01) | |
| *C08L 67/02* | (2006.01) | |
| *C09D 167/02* | (2006.01) | |
| *C09J 7/38* | (2018.01) | |
| *C09J 7/40* | (2018.01) | |

(52) U.S. Cl.
CPC ....... *C08G 63/916* (2013.01); *C08G 63/6886* (2013.01); *C08K 5/34922* (2013.01); *C08K 5/5435* (2013.01); *C08L 67/02* (2013.01); *C09D 167/02* (2013.01); *C09J 7/38* (2018.01); *C09J 7/401* (2018.01); *C08L 2205/02* (2013.01)

(58) Field of Classification Search
CPC .......... C08L 2205/02; C08L 2205/025; C08L 67/02; C08G 63/688; C08G 63/6884; C08G 63/6886; C09D 167/02
See application file for complete search history.

(56) References Cited

U.S. PATENT DOCUMENTS

| | | | |
|---|---|---|---|
| 4,480,085 A | 10/1984 | Larson | |
| 5,298,325 A | 3/1994 | Culbertson | |
| 5,369,210 A * | 11/1994 | George | C08G 63/6886 528/286 |
| 5,380,590 A | 1/1995 | Nakamura | |
| 5,409,773 A | 4/1995 | Kessel | |
| 5,424,120 A | 6/1995 | Culbertson | |
| 5,520,978 A | 5/1996 | Boardman | |
| 6,576,717 B1 | 6/2003 | Kuo | |
| 8,520,879 B2 | 8/2013 | Yoshino | |
| 8,911,873 B2 | 12/2014 | Suwa | |
| 2003/0212192 A1 | 11/2003 | Yuan | |
| 2005/0171250 A1 | 8/2005 | Hayes | |
| 2011/0019280 A1 | 1/2011 | Lockridge | |
| 2011/0103036 A1 | 5/2011 | Bösl | |
| 2012/0321872 A1 | 12/2012 | Nachshon-Galili | |
| 2014/0030535 A1 | 1/2014 | Malotky | |
| 2016/0312056 A1 | 10/2016 | Ouzineb | |

FOREIGN PATENT DOCUMENTS

| | | |
|---|---|---|
| CN | 103980792 | 9/2016 |
| EP | 0882576 | 12/1998 |
| JP | 2017-113923 | 6/2017 |
| WO | WO 2009-123921 | 10/2009 |

(Continued)

OTHER PUBLICATIONS

International Search Report for PCT International Application No. PCT/IB2020/052802, mailed on Jun. 9, 2020, 4 pages.

(Continued)

*Primary Examiner* — Kregg T Brooks
(74) *Attorney, Agent, or Firm* — Philip P. Soo (57) ABSTRACT

Uncured aqueous composition comprising surfactant and a blend of (a) a first sulfonated polyester having a glass transition temperature not greater than 75° C. that is not sulfonated polyethylene naphthalate, (b) a second, sulfonated polyester that is a sulfonated polyethylene naphthalate, (c) melamine-formaldehyde crosslinker, and (d) an epoxy silane coupling agent; and cured composition thereof. Compositions described herein are useful, for example, for making primed film for release liners applications.

14 Claims, 1 Drawing Sheet

(56) References Cited

FOREIGN PATENT DOCUMENTS

| WO | WO 2011-084661 | 7/2011 |
| WO | WO 2013-181133 | 12/2013 |
| WO | WO 2018-034919 | 2/2018 |
| WO | WO 2020-201924 | 10/2020 |
| WO | WO 2020-201929 | 10/2020 |

OTHER PUBLICATIONS

International Search Report for PCT International Application No. PCT/IB2020/052805, mailed on Jun. 19, 2020, 4 pages.
International Search Report for PCT International Application No. PCT/IB2020/052814, mailed on Jul. 2, 2020, 4 pages.

\* cited by examiner

COMPOSITION AND ARTICLE COMPRISING THE SAME

CROSS REFERENCE TO RELATED APPLICATIONS

This application is a national stage filing under 35 U.S.C. § 371 of PCT/IB2020/052802, filed Mar. 25, 2020, which claims the benefit of Provisional Application No. 62/825,964, filed Mar. 29, 2019, the disclosure of which is incorporated by reference in its/their entirety herein.

BACKGROUND

In the manufacture of touch panels and electronic displays, a pressure sensitive adhesive (PSA) is sometimes applied to an optical surface by transfer from a release tape or film, via application of the adhesive-laden transfer tape or film and subsequent removal of the supporting release film, leaving behind the adhesive on the optical surface. Due to the PSA being incorporated into the viewing area of the device, it is desirable for the PSA to be delivered to the device in a clean, pristine manner such that the resulting adhesive layer is free from defects and distortions. Common release liners for PSAs known in the art (e.g., U.S. Pat. No. 5,298,325 (Culbertson)) are suitable for some uses.

SUMMARY

Applicant discovered the, need improvement to address the application with clean removal from new soft PSAs such as those described in U.S. Pat. No. 8,911,873 (Toshihiro et al.). In some cases, the use of such a sulfopolyester coating can prime the PET film for adhesion of the silicone layer, yet the silicone layer may not remove cleanly from the PSA layer without any objectionable optical defects, herein described as whitening. In a display, whitening requires removal and replacement of the PSA, resulting in increased manufacturing cost for the display.

Thus, there is a need for improved release liners made from polymeric films to transfer pressure sensitive adhesive (PSA) to touch panels and electronic devices in general.

In one aspect, the present disclosure describes an uncured aqueous composition (i.e., a composition where at least 50 percent by weight of liquid present is water) comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, or even not greater than −5; in some embodiments, in a range from −10 to 75, 0 to 60, 10 to 60, 20 to 60, 25 to 60, or even, 45 to 55) ° C. that is not sulfonated polyethylene naphthalate, (b) a second- sulfonated polyester that is a sulfonated polyethylene naphthalate, (c) melamine-formaldehyde crosslinker, and (d) an epoxy silane coupling agent.

In another aspect, the present disclosure described an article comprising, in order:
a first polymeric film (e.g., one of a polyester, polypropylene, or polyethylene film) having first and second, opposed major surfaces,
a first layer having first and second, opposed major surfaces on the first major surface of the first polymeric layer, the first layer provided by curing a composition comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, and even not greater than −5; in some embodiments, in a range from −10 to 75, 0 to 60, 10 to 60, 20 to 60, 25 to 60, or even, 45 to 55) ° C. that is not sulfonated polyethylene naphthalate, (b) a second sulfonated polyester that is a sulfonated polyethylene naphthalate, (c) melamine-formaldehyde crosslinker, and (d) an epoxy silane coupling agent; and
a first release layer having first and second, opposed major surfaces on the first major surface of the first layer.

Compositions described herein are useful, for example, for making primed film for release liners applications.

DETAILED DESCRIPTION

Figure 1:
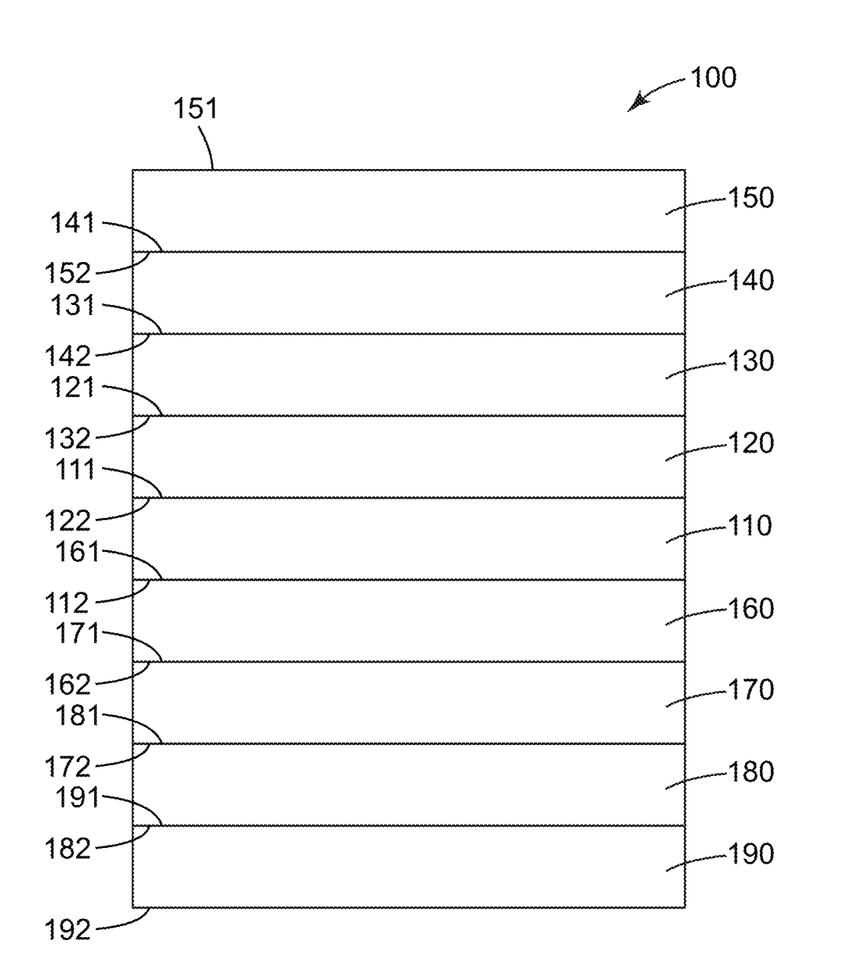
The FIGURE is a schematic of an exemplary article described herein.

Exemplary surfactants include nonionic surfactants such as nonionic ethoxylated alcohols. In some embodiments, the surfactant is present in a range from 0 to 2 (in some embodiments, in a range from 0.05 to 1, 0.05 to 0.5, 0.05 to 0.25, or even 0.05 to 0.15) weight percent, based the total solids content of the aqueous composition. Exemplary surfactants are available, for example, under the trade designations "TOMADOL 25-9" from Air Products, Allentown, PA; and "DYNOL 607" from Evonik Nutrition & Care GmbK, Essen, Germany.

The first sulfonated polyester has a glass transition temperature not greater than 75 (in some embodiments, not greater than 70, 65, 60, 55, 50, 45, 40, 35, 30, 25, 20, 15, 10, 5, 0, or even −5; in some embodiments, in a range from −10 to 75, 0 to 60, 10 to 60, 20 to 60, 25 to 60, or even, 45 to 55) ° C.

In some embodiments, the second polyester that is a sulfonated polyethylene naphthalate has a glass transition temperature not greater than 120 (in some embodiments, not greater than 110, 100, 95, 90, 85, 80, 75, 70, 65, 60, 55, 50, 45, 40, 35, 30, 25, 20, 15, 10, 5, 0, or even −5; in some embodiments, in a range from −10 to 120, −10 to 110, −10 to 100, −10 to 90, −10 to 75, 0 to 60, 10 to 60, 20 to 60, 25 to 60, or even, 45 to 55) ° C.

In some embodiments, at least one of the sulfonated polyester or sulfonated polyethylene naphthalate independently comprises an oxyalkylene (OR) having a carbon chain length of at least 2 (in some embodiments, at least 3, 4, 5, 6, 7 or even at least 8; in some embodiments, up to 20, 21, 22, 23, 24, 25, 26, 27, 28, 29, 30, 31, 32, 33, 34, 35 or even up to 36) carbon atoms.

In some embodiments, at least one of the first sulfonated polyester or the sulfonated polyethylene naphthalate independently have the formula:

wherein n is at least 10 (in some embodiments, at least 20, 30, 40 50 100, 200, 250, 500, 1000, 5000, 8000, or even 10000), and wherein at least some R' comprise arylenesulfonate (e.g., at least one alkali arylenesulfonate). In some embodiments, the arylenesulfonate comprises at least one of a phenylenesulfonate, an isophthalylene-5-sulfonate, a terephthalylene-sulfonate, or a phthalylene-sulfonate. In some embodiments, the arylenesulfonate comprises at least one of lithium arylenesulfonate, sodium arylenesulfonate, potassium arylenesulfonate, calcium arylenesulfonate, beryllium arylenesulfonate, a zinc arylenesulfonate, a zirconium arylenesulfonate, a vanadium arylenesulfonate, copper arylenesulfonate, or aluminum arylenesulfonate.

Exemplary sulfonated polyesters are available, for example, under the trade designations "SKYBON" from SKCs America Inc., Irvine, CA, and "EASTEK" from Eastman Chemical Company, Kingsport, TN Exemplary sulfonated polyethylene naphthalate can be synthesized by techniques known in the art such as from dimethyl naphthalate, a dimethyl sodium 5-sulfoisophthalate, and ethylene glycol as described in Examples 3 and 4.

In some embodiments, the first and sulfonated polyester is present in a range from greater than zero to 50 (in some embodiments, in a range from 0.1 to 50, 5 to 45, 10 to 40, 10 to 35, or even 10 to 20) weight percent, based on the total solids of the uncured aqueous composition. In some embodiments, the sulfonated polyethylene naphthalate is present in a range from greater than 0 to 40 (in some embodiments, in a range from 10 to 40, or even 20 to 30) weight percent, based on the total solids of the uncured aqueous composition.

Melamine-formaldehyde crosslinker refers to water dispersible partially alkylated melamine-formaldehyde resins. In some embodiments, the melamine-formaldehyde crosslinker comprises a partially alkoxymethylated melamine formaldehyde resin. An exemplary water dispersible partially alkylated melamine-formaldehyde resin is available, for example, under the trade designation "CYMEL 327" from Allnex Corporation, Alpharetta, GA.

In some embodiments, the melamine-formaldehyde crosslinker is present in a range from greater than zero to 20 (in some embodiments, in a range from 1 to 20, 2 to 18, 3 to 15, or even 5 to 10) weight percent, based on the total solids of the uncured aqueous composition.

Exemplary epoxy silane coupling agents include glycidol epoxy functional silane. Exemplary epoxy silane coupling agents are available, for example under the trade designations "SILQUEST A-187" and "WETLINK 78" from Momentive Performance Chemicals Inc., Waterford, NY.

In some embodiments, the silane is present in a range from 1 to 30 (in some embodiments, in a range from 2 to 25, or even 5 to 20) weight percent, based on total solids content of the uncured aqueous composition.

In some embodiments, uncured aqueous composition described herein further comprise colloidal silica. In some embodiments, the colloidal silica is present in a range from greater than 0 to 10 (in some embodiments, in a range from 1 to 5, 1 to 3, or even 1 to 2.5) weight percent, based the total solids content of the uncured aqueous composition. Exemplary colloidal silicas are available, for example, under the trade designation "AERODISP W-1226" from Evonik Corporation, Allentown, PA; and "LUDOX" from & Co. Americas, Columbia, MD.

In some embodiments, the colloidal silica comprises silica particles in a range from 0.05 to 10 (in some embodiments, in a range from 0.1 to 10, 0.1 to 5, 0.5 to 5, or even 1 to 2.5) micrometers.

In some embodiments, uncured aqueous composition described herein further comprise a catalyst. Although not wanting to be bound by theory, it is believed that the catalyst increases the reaction rate and completeness of the crosslinked polymer. An exemplary catalyst is an amine blocked para-toluene sulfonic acid catalyst, available, for example, under the trade designation "CYCAT 4045" from Allnex, Alpharetta, GA.

In some embodiments, the catalyst is present in a range from 0 to 2 (in some embodiments, in a range from 0.01 to 1.5, 0.1 to 1, or even 0.1 to 0.5) weight percent, based the total solid of the uncured aqueous composition.

The raw materials for making the uncured aqueous composition by conventional techniques known in the art such as die coating, gravure coating, Mayer bar coating, air knife coating, dip coating, and spin coating.

Uncured aqueous composition described herein can be cured by conventional techniques known in the art such as thermal curing.

Compositions described herein are useful, for example, for making articles such as adhesion promotors to silicone release coatings.

An exemplary article comprises, in order:
- a first polymeric film having first and second, opposed major surfaces;
- a first layer having first and second, opposed major surfaces on the first major surface of the first polymeric layer, the first provided by curing an uncured aqueous composition described herein;
- a first release layer (e.g., silicone release layer) having first and second, opposed major surfaces on the first major surface of the first layer;
- an optional first optically clear adhesive layer having first and second, opposed major surfaces on the first major surface of the first release layer; and
- an optional second polymeric film (e.g., one of a polyester, polypropylene, or polyethylene film) having first and second, opposed major surfaces on the first major surface of the first optically clear layer;
- an optional second layer having first and second, opposed major surfaces on the second major surface of the first polymeric film;
- an optional second release layer (e.g., a silicone release layer) having first and second, opposed major surfaces on the second major surface of the second layer;
- an optional second optically clear adhesive layer having first and second, opposed major surfaces on the second major surface of the second release layer; and
- optional third polymeric film (e.g. one of a polyester film or polypropylene film) having first and second, opposed major surfaces on the second major surface of the second release layer.

In some embodiments, the first or optional second optically clear adhesive layer comprises a (meth)acrylate copolymer having pendant (meth)acryloyl groups and optionally pendant hydroxyl groups (e.g., compounded with a free-radical generating initiator), wherein the (meth)acrylate copolymer has a weight average molecular weight of 50,000 to 600,000 Daltons and an average molecular weight between (meth)acryloyl groups equal to at least 16,000 Daltons. In some embodiments, the first or optional second optically clear adhesive layer has a thickness in a range from 100 to 250 (in some embodiments, in a range from 125 to 200) micrometers.

In some embodiments, the optional second layer comprises a cured aqueous composition described herein provided by curing an uncured aqueous composition described herein, by curing an uncured aqueous composition described in copending application having U.S. Ser. No. 62/825,961, filed the same date as the instant application, the disclosure of which is incorporated herein by reference. In some embodiments, the optional second layer comprises a corona treatment, for example, of a polyethylene terephthalate (PET) film In some embodiments of articles described herein, the first or optional second layer independently has a thickness in a range from 0.05 to 0.5 (in some embodiments, in a range from 0.01 to 0.5) micrometer.

In some embodiments, the first, optional second, or optional third polymeric film is independently one of one of a polyester, polypropylene, or polyethylene film.

In some embodiments of articles described herein, the first, optional second, or optional third polymeric film has a thickness in a range from 25 to 125 (in some embodiments, in a range from 50 to 75) micrometers.

In some embodiments of articles described herein, the first or optional second release layer has a thickness of at least 0.02 (in some embodiments, in a range from 0.025 to 0.5, or even 0.05 to 0.5) micrometer.

In some embodiments, articles described herein have a thickness in a range from 200 to 400 micrometers.

Referring to the FIG., exemplary article described herein 100 is shown. Article 100 comprises first polymeric film 110 having first and second, opposed major surfaces 111, 112, first layer 120 having first and second, opposed major surfaces 121, 122, first release layer 130 having first and second, opposed major surfaces 131, 131 optional first optically clear adhesive layer 140 having first and second, opposed major surfaces 141, 142, optional second polymeric film 150 having first and second major surfaces 151, 152, optional second layer 160 having first and second major surfaces 161, 162, optional second release layer 170 having first and second, opposed major surfaces 171, 172, optional second optically clear adhesive layer 180 having first and second, opposed major surfaces 181, 182, and optional third polymeric film 190 having first and second major surfaces 191, 192. First layer 120 provided by curing an uncured aqueous composition described herein.

Compositions described herein are useful, for example, for making primed film for release liners applications.

Exemplary Embodiments

1A. An uncured aqueous composition comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, or even not greater than −5; in some embodiments, in a range from −10 to 75, 0 to 60, 10 to 60, 20 to 60, 25 to 60, or even, 45 to 55) ° C. that is not sulfonated polyethylene naphthalate, (b) a second sulfonated polyester that is a sulfonated polyethylene naphthalate, (c) melamine-formaldehyde crosslinker, and (d) an epoxy silane coupling agent.

2A. The uncured aqueous composition of Exemplary Embodiment 1A, wherein at least one of the sulfonated polyester or sulfonated polyethylene naphthalate independently comprises an oxyalkylene (OR) having a carbon chain length of at least 2 (in some embodiments, at least 3, 4, 5, 6, 7 or even at least 8; in some embodiments, up to 20, 21, 22, 23, 24, 25, 26, 27, 28, 29, 30, 31, 32, 33, 34, 35 or even up to 36) carbon atoms.

3A. The uncured aqueous composition of either Exemplary Embodiment 1A or 2A, wherein at least one of the first sulfonated polyester or the sulfonated polyethylene naphthalate independently have the formula:

wherein n is at least 10 (in some embodiments, at least 20, 30, 40 50 100, 200, 250, 500, 1000, 5000, 8000, or even 10000), and wherein at least some R' comprise arylenesulfonate (e.g., at least one alkali arylenesulfonate).

4A. The uncured aqueous composition of Exemplary Embodiment 3A, wherein the arylenesulfonate comprises at least one of a phenylenesulfonate, an isophthalylene-5-sulfonate, a terephthalylene-sulfonate, or a phthalylene-sulfonate.

5A. The uncured aqueous composition of either Exemplary Embodiment 3A or 4A, the arylenesulfonate comprises at least one of lithium arylenesulfonate, sodium arylenesulfonate, potassium arylenesulfonate, calcium arylenesulfonate, beryllium arylenesulfonate, a zinc arylenesulfonate, a zirconium arylenesulfonate, a vanadium arylenesulfonate, copper arylenesulfonate, or aluminum arylenesulfonate.

6A. The uncured aqueous composition of any preceding A Exemplary Embodiment, wherein the first sulfonated polyester is present in a range from greater than zero to 50 (in some embodiments, in a range from 0.1 to 50, 5 to 45, 10 to 40, 10 to 35, or even 10 to 20 zero to 50 (in some embodiments, in a range from 0.1 to 50, 5 to 45, 10 to 40, 10 to 35, or even 10 to 20 zero to 50 (in some embodiments, in a range from 0.1 to 50, 5 to 45, 10 to 40, 10 to 35, or even 10 to 20) weight percent, based on the total solids of the aqueous composition.

7A. The uncured aqueous composition of any preceding A Exemplary Embodiment, wherein the sulfonated polyethylene naphthalate is present in a range from greater than 0 to 40 (in some embodiments, in a range from 10 to 40, or even 20 to 30) weight percent, based on the total solids of the aqueous composition.

8A. The uncured aqueous composition of any preceding A Exemplary Embodiment, wherein the melamine-formaldehyde crosslinker comprises a partially alkoxymethylated melamine formaldehyde resin.

9A. The uncured aqueous composition of any preceding A Exemplary Embodiment, wherein the melamine-formaldehyde crosslinker is present in a range from greater than zero to 20 (in some embodiments, in a range from 1 to 20, 2 to 18, 3 to 15, or even 5 to 10) weight percent, based on the total solids of the uncured aqueous composition.

10A. The uncured aqueous composition of any preceding A Exemplary Embodiment, wherein the epoxy silane coupling agent comprises a glycidol epoxy functional silane.

11A. The uncured aqueous composition of any preceding A Exemplary Embodiment, wherein the epoxy silane coupling agent silane is present in a range from 1 to 30 (in some embodiments, in a range from 2 to 25, or even 5 to 20) weight percent, based on total solids content of the uncured aqueous composition.

12A. The uncured aqueous composition of any preceding A Exemplary Embodiment, wherein the surfactant comprises a nonionic ethoxylated alcohol.

13A. The uncured aqueous composition of any preceding A Exemplary Embodiment, wherein the surfactant is present in a range from 0 to 2 (in some embodiments, in a range from 0.05 to 1, 0.05 to 0.5, 0.05 to 0.25, or even 0.05 to 0.15) weight percent, based the total solids content of the aqueous composition.

14A. The uncured aqueous composition of any preceding A Exemplary Embodiment, further comprising colloidal silica.
15A. The uncured aqueous composition of Exemplary Embodiment 14A, wherein the colloidal silica comprises silica particles in a range from 0.05 to 10 (in some embodiments, in a range from 0.1 to 10, 0.1 to 5, 0.5 to 5, or even 1 to 2.5) micrometers.
16A. The uncured aqueous composition of either Exemplary Embodiment 14A or 15A, wherein the colloidal silica is present in a range from greater than 0 to 10 (in some embodiments, in a range from 1 to 5, 1 to 3, or even 1 to 2.5) weight percent, based the total solids content of the aqueous composition.
17A. The uncured aqueous composition of any preceding A Exemplary Embodiment, further comprising catalyst.
18A. The uncured aqueous composition of Exemplary Embodiment 17A, wherein the catalyst comprises an acid catalyst (e.g., such as amine blocked para-toluene sulfonic acid).
19A. The uncured aqueous composition of either Exemplary Embodiment 17A or 18A, wherein the catalyst is present in a range from 0 to 2 (in some embodiments, in a range from 0.01 to 1.5, 0.1 to 1, or even 0.1 to 0.5) weight percent, based the total solid of the uncured aqueous composition.
1B. The uncured aqueous composition of any preceding A Exemplary Embodiment that is cured.
1C. An article comprising, in order:
  a first polymeric film having first and second, opposed major surfaces,
  a first layer having first and second, opposed major surfaces on the first major surface of the first polymeric layer, the first layer provided by curing a composition comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, or even not greater than −5; in some embodiments, in a range from −10 to 75, 0 to 60, 10 to 60, 20 to 60, 25 to 60, or even, 45 to 55) ° C. that is not sulfonated polyethylene naphthalate, (b) a second sulfonated polyester that is a sulfonated polyethylene naphthalate, (c) melamine-formaldehyde crosslinker, and (d) an epoxy silane coupling agent; and
  a first release layer having first and second, opposed major surfaces on the first major surface of the first layer.
2C. The article of Exemplary Embodiment 1C, wherein at least one of the sulfonated polyester or sulfonated polyethylene naphthalate independently comprises an oxyalkylene (OR) having a carbon chain length of at least 2 (in some embodiments, at least 3, 4, 5, 6, 7 or even at least 8; in some embodiments, up to 20, 21, 22, 23, 24, 25, 26, 27, 28, 29, 30, 31, 32, 33, 34, 35 or even up to 36) carbon atoms.
3C. The article of either Exemplary Embodiment 1C or 2C, wherein at least one of the first sulfonated polyester or the sulfonated polyethylene naphthalate independently have the formula:

wherein n is at least 10 (in some embodiments, at least 20, 30, 40 50 100, 200, 250, 500, 1000, 5000, 8000, or even 10000), and wherein at least some R' comprise arylenesulfonate (e.g., at least one alkali arylenesulfonate).

4C. The article of Exemplary Embodiment 3C, wherein the arylenesulfonate comprises at least one of a phenylenesulfonate, an isophthalylene-5-sulfonate, a terephthalylenesulfonate, or a phthalylene-sulfonate.
5C. The article of either Exemplary Embodiment 3C or 4C, the arylenesulfonate comprises at least one of lithium arylenesulfonate, sodium arylenesulfonate, potassium arylenesulfonate, calcium arylenesulfonate, beryllium arylenesulfonate, a zinc arylenesulfonate, a zirconium arylenesulfonate, a vanadium arylenesulfonate, copper arylenesulfonate, or aluminum arylenesulfonate.
6C. The article of any preceding C Exemplary Embodiment, wherein the first sulfonated polyester is present in a range from greater than zero to 50 (in some embodiments, in a range from 0.1 to 50, 5 to 45, 10 to 40, 10 to 35, or even 10 to 20) weight percent, based on the total solids of the composition.
7C. The article of any preceding C Exemplary Embodiment, wherein the sulfonated polyethylene naphthalate is present in a range from greater than 0 to 40 (in some embodiments, in a range from 10 to 40, or even 20 to 30) weight percent, based on the total solids of the composition.
8C. The article of any preceding C Exemplary Embodiment, wherein the melamine-formaldehyde crosslinker comprises a partially alkoxymethylated melamine formaldehyde resin.
9C. The article of any preceding C Exemplary Embodiment, wherein the melamine-formaldehyde crosslinker is present in a range from 0 to 20 (in some embodiments, in a range from 1 to 15, 2 to 15, or even 5 to 10) weight percent, based the total solids content of the composition.
10C. The uncured aqueous composition of any preceding C Exemplary Embodiment, wherein the epoxy silane coupling agent comprises a glycidol epoxy functional silane.
11C. The uncured aqueous composition of any preceding C Exemplary Embodiment, wherein the epoxy silane coupling agent silane is present in a range from 1 to 30 (in some embodiments, in a range from 2 to 25, or even 5 to 20) weight percent, based on total solids content of the uncured aqueous composition.
12C. The article of any preceding C Exemplary Embodiment, wherein the surfactant comprises a nonionic ethoxylated alcohol.
13C. The article of any preceding C Exemplary Embodiment, wherein the surfactant is present in a range from 0 to 2 (in some embodiments, in a range from 0.05 to 1, 0.05 to 0.5, 0.05 to 0.25, or even 0.05 to 0.15) weight percent, based the total solids content of the composition.
14C. The article of any preceding C Exemplary Embodiment, further comprising colloidal silica.
15C. The article of Exemplary Embodiment 14C, wherein the colloidal silica comprises silica particles in a range from 0.05 to 10 (in some embodiments, in a range from 0.1 to 10, 0.1 to 5, 0.5 to 5, or even 1 to 2.5) micrometers.
16C. The article of either Exemplary Embodiment 14C or 15C, wherein the colloidal silica is present in a range from greater than 0 to 10 (in some embodiments, in a range from 1 to 5, 1 to 3, or even 1 to 2.5) weight percent, based the total solids content of the composition.
17C. The article of any preceding C Exemplary Embodiment, further comprising catalyst.
18C. The article of Exemplary Embodiment 17C, wherein the catalyst comprises an acid catalyst (e.g., such as amine blocked para-toluene sulfonic acid).
19C. The article of either Exemplary Embodiment 17C or 18C, wherein the catalyst is present in a range from 0 to 2

(in some embodiments, in a range from 0.01 to 1.5, 0.1 to 1, or even 0.1 to 0.5) weight percent, based the total solids content of the composition.

20C. The article of any preceding C Exemplary Embodiment, wherein the first release layer is a silicone release layer.

21C. The article of any preceding C Exemplary Embodiment, further comprising a first optically clear adhesive layer having first and second, opposed major surfaces on the first major surface of the first release layer.

22C. The article of Exemplary Embodiment 21C, wherein the first optically clear adhesive layer comprises a (meth) acrylate copolymer having pendant (meth)acryloyl groups and optionally pendant hydroxyl groups (e.g., compounded with a free-radical generating initiator), wherein the (meth) acrylate copolymer has a weight average molecular weight of 50,000 to 600,000 Daltons and an average molecular weight between (meth)acryloyl groups equal to at least 16,000 Daltons.

23C. The article of any either Exemplary Embodiment 21C or 22C, wherein the first optically clear adhesive layer has a thickness in a range from 100 to 250 (in some embodiments, in a range from 125 to 200) micrometers.

24C. The article of any of Exemplary Embodiments 21C to 23C, further comprising a second polymeric film having first and second, opposed major surfaces on the first major surface of the first optically clear layer, wherein the article comprises in order, the first polymeric film, the first layer, the first release layer, the first optically clear layer, and the second polymeric film.

25C. The article of Exemplary Embodiment 24C, wherein the second polymeric film is one of a polyester, polypropylene, or polyethylene film.

26C. The article of any preceding C Exemplary Embodiment, wherein the first polymeric film has a thickness in a range from 25 to 125 (in some embodiments, in a range from 50 to 75) micrometers.

27C. The article of any preceding C Exemplary Embodiment, wherein the first layer has a thickness in a range from 0.05 to 0.5 (in some embodiments, in a range from 0.01 to 0.5) micrometer.

28C. The article of any preceding C Exemplary Embodiment, wherein the first release layer has a thickness of at least 0.02 (in some embodiments, in a range from 0.025 to 0.5, or even 0.05 to 0.5) micrometer.

29C. The article of any preceding C Exemplary Embodiment, wherein the first polymeric film is one of a polyester, polypropylene, or polyethylene film.

30C. The article of any preceding C Exemplary Embodiment having a thickness in a range from 200 to 400 micrometers.

31C. The article of any preceding C Exemplary Embodiment, further comprising a second layer having first and second, opposed major surfaces on the second major surface of the first polymeric film.

32C. The article of Exemplary Embodiment 31C, wherein the second layer provided by curing a composition comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, or even not greater than −5; in some embodiments, in a range from −10 to 75, 0 to 60, 10 to 60, 20 to 60, 25 to 60, or even, 45 to 55) ° C. that is not sulfonated polyethylene naphthalate, (b) a second sulfonated polyester that is a sulfonated polyethylene naphthalate, (c) melamine-formaldehyde crosslinker, and (d) an epoxy silane coupling agent.

33C. The article of either Exemplary Embodiment 31C or 32C, further comprising a second release layer having first and second, opposed major surfaces on the second major surface of the second layer.

34C. The article of Exemplary Embodiment 33C, wherein the second release layer is a silicone release layer.

35C. The article of either Exemplary Embodiment 33C or 34C, further comprising a second optically clear adhesive layer having first and second, opposed major surfaces on the second major surface of the second release layer.

36C. The article of Exemplary Embodiment 35C, wherein the second optically clear adhesive layer comprises a (meth) acrylate copolymer having pendant (meth)acryloyl groups and optionally pendant hydroxyl groups (e.g., compounded with a free-radical generating initiator), wherein the (meth) acrylate copolymer has a weight average molecular weight of 50,000 to 600,000 Daltons and an average molecular weight between (meth)acryloyl groups equal to at least 16,000 Daltons.

37C. The article of any either Exemplary Embodiment 35C or 36C, wherein the second optically clear adhesive layer has a thickness in a range from 100 to 250 (in some embodiments, in a range from 125 to 200) micrometers.

38C. The article of any of Exemplary Embodiments 35C to 37C, further comprising a third polymeric film having first and second, opposed major surfaces on the second major surface of the second release layer, wherein the article comprises in order, the first polymeric film, the first aqueous composition layer, the first release layer, the first optically clear layer, the second polymeric film, the second aqueous composition layer, the second optically clear adhesive, and the third polymeric film.

39C. The article of Exemplary Embodiment 38C, wherein the third polymeric film is one of a polyester, polypropylene, or polyethylene film.

40C. The article of any of Exemplary Embodiments 35C to 39C, wherein the third film has a thickness in a range from 25 to 125 (in some embodiments, in a range from 50 to 75) micrometers.

41C. The article of any of Exemplary Embodiments 35C to 40C, wherein the second layer has a thickness in a range from 0.05 to 0.5 (in some embodiments, in a range from 0.01 to 0.5) micrometer.

42C. The article of any of Exemplary Embodiments 35C to 41C, wherein the second release layer has a thickness of at least 0.02 (in some embodiments, in a range from 0.025 to 0.5, or even 0.05 to 0.5) micrometer.

43C. The article of any of Exemplary Embodiments 35C to 42C having a thickness in a range from 200 to 400 micrometers.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials used in the preparation of the resins, solutions, and formulations of the examples are listed in Table 1, below.

TABLE 1

| Material Name, Acronym, or Designation | Description | Source |
|---|---|---|
| Isopropanol | Isopropyl alcohol (2-propanol) | VWR International LLC., Radner, PA |
| TA | Terephthalic acid | CEPSA Quimia, Montreal, Quebec, Canada |
| SSIPA | 5-sulfoisophthalic acid, sodium salt (Sodium sulfoisophthalic acid) | FutureFuel, Batesville, AR |
| IPA | Isophthalic acid | Eastman Chemical, Kingsport, TN |
| NPG | Neopentyl glycol | Eastman Chemical, Kingsport, TN |
| EG | Ethylene glycol | ME Global, Midland, MI |
| AT | Antimony triacetate | Arkema, Philadelphia, PA |
| SA | Sodium acetate | Alfa Aesar, Ward Hill, MA |
| MA | Maleic anhydride | Sigma-Aldrich, St. Louis, MO |
| TT | Tetrabutyl titanate | Sigma-Aldrich, St. Louis, MO |
| TOMADOL 25-9 | Non-ionic surfactant, obtained under the trade designation "TOMADOL 25-9" | Evonik Corporation, Parsippany, NJ |
| SILQUEST A-187 | Glycidoxypropyltrimethoxy (epoxy functional) silane, obtained under the trade designation "SILQUEST A-187" | Momentive Performance Chemicals Inc., Waterford, NY |
| AERODISP W1226 | Aqueous dispersion of hydrophilic fumed silica, obtained under the trade designation "AERODISP W 1226" | Evonik Corporation, Parsippany, NJ |
| CYMEL 327 | Melamine formaldehyde resin, obtained under the trade designation "CYMEL 327" | Allnex USA Inc., Alpharetta, GA |
| CYCAT 4045 | Para toluene sulfonic acid catalyst, amine blocked, obtained under the trade designation "CYCAT 4045" | Allnex USA Inc., Alpharetta, GA |
| VTSP | A divinyl terminated silicone polymer with viscosity of 250 to 400 cS, a vinyl content of 0.53 to 0.66 wt. %, and containing 150 ppm platinum, and 0.7 wt. % inhibitor | Dow Corning Corporation, Midland, MI |
| HFSX | A liquid, hydride functional polysiloxane crosslinker component, 100% solids and having a viscosity at 25° C. of 30 cS, obtained under the trade designation "SYL-OFF 7678 CROSSLINKER" | Dow Corning Corporation, Midland, MI |
| NDC | Dimethyl-2,6-napthalene dicarboxylate | Sigma-Aldrich, St. Louis, MO |
| Trimesic Acid | Benzene-1,3,5-tricarboxylic acid | Sigma-Aldrich, St. Louis, MO |
| DMSSIP | Dimethyl 5-sulfoisophthalate, sodium salt (Dimethyl sodium 5-sulfoisophthalate) | Sigma-Aldrich, St. Louis, MO |
| Calcium Acetate | Calcium acetate | Sigma-Aldrich, St. Louis, MO |
| Cobalt Acetate | Cobalt acetate | Sigma-Aldrich, St. Louis, MO |
| Adipic Acid | Hexanedioic acid | Sigma-Aldrich, St. Louis, MO |
| Sebacic Acid | Decanedioic acid | Sigma-Aldrich, St. Louis, MO |
| EASTEK 1100 | Sulfonated polyester aqueous dispersion containing 33 wt. % polymer solids, obtained under the trade designation "EASTEK 1100" | Eastman Chemical Co., Kingsport, TN |

Example 1

Preparation of SulfoPET 1 Resin

To a clean, dry, oil jacketed 100-gallon (378.5-liter) stainless-steel reactor, the following materials were added: 125.1 lbs. (56.7 kg) of terephthalic acid (TA); 23.4 lbs. (10.6 kg) of 5-sodium sulfoisophthalic acid (SSIPA); 123.7 lbs. (56.1 kg) of isophthalic acid (IPA); 123.7 lbs. (56.1 kg) of neopentyl glycol (NPG); 146.8 lbs. (66.6 Kg) of ethylene glycol (EG); 126.6 grams of antimony triacetate (AT), and 318.5 grams of sodium acetate (SA). The stainless-steel reactor was placed under 30 psig (308.1 kPa) of nitrogen pressure. The contents of the stainless-steel reactor were heated, and it is believed transesterification typical for polyester synthesis took place. The batch was heated to about 485° F. (about 252° C.). Once esterification was determined to be completed, pressure in the reactor was slowly vented.

It is believed a typical polyester polymerization was then commenced. Vacuum was slowly pulled on the reactor and heat was applied. Excess glycol was removed. Eventually, the stainless-steel reactor reached a temperature of 525° F. (274° C.) and a vacuum of as low as 1.5 mm Hg (0.2 kPa). Once target IV (intrinsic viscosity) of about 0.50 dL/g was achieved, the batch was pressurized (under nitrogen) and drained into aluminum trays. The cooled and solidified contents of the trays was ground up and utilized for SulfoPET 1 solution making. The resultant polymer was composed of moieties from about 5.5 mol % SSIPA, 47.5 mol % TA, and 47 mol % IPA on an acids basis; and 75 mol % NPG and 25 mol % EG on a diol basis.

Preparation of SulfoPET 1 Resin Solution 726.4 grams of the SulfoPET 1 resin, 726.4 grams of isopropanol and 2905.6 grams of water were added to a room temperature (about 22° C.), 2-gallon (7.57-liter) stainless-steel reactor. The stainless-steel reactor was heated to 88° C. and held at this temperature for 90 minutes. The batch was then heated to 94° C. and held at temperature until the isopropanol was driven off through a separation column. The stainless-steel reactor was then drained, and the resultant material. SulfoPET 1 resin solution was a 20 wt. % solids aqueous dispersion containing the SulfoPET 1.

Preparation of SulfoPET 1/Sulfopolyester ("EASTEK 1100") Primer Formulation

Into a 113-mL glass jar, the following components were added, and then stirred for 5 minutes: 3.8 grams of SulfoPET 1 Resin Solution, 2.1 grams of sulfopolyester ("EASTEK 1100"), 1 gram of non-ionic surfactant ("TOMADOL 25-9")

(added as a 10 wt. % dilution in deionized (DI) water), 41.0 grams of DI water, and 0.5 gram of glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram of para toluene sulfonic acid catalyst, amine blocked ("CYCAT 4045") (added as a 10 wt. % dilution in DI water). This mixture was stirred for 3 minutes and the coating solution was then ready for coating.

Example 2

Preparation of SulfoPET 2 Resin

To a stainless-steel 1-gallon (3.78-liter) reactor at room temperature (about 22° C.), equipped with electrical heating, an overhead separation column, and a vacuum pump, the following components were added: 842.6 grams of ethylene glycol (EG), 269.3 grams of neopentyl glycol (NPG), 663.7 grams of terephthalic acid (TA), 663.7 grams of isophthalic acid (IPA), 8.5 grams of maleic anhydride (MA), 138.2 grams of SSIPA, 0.405 gram of sodium acetate (SA), and 0.203 gram of tetrabutyl titanate (TT).

Once added, it is believed these materials underwent a typical polyester polymerization process as described above for SulfoPET Resin 1. The stainless-steel reactor was drained, and the reaction product resin was cooled to room temperature (about 22° C.). Then the resin was ground up into small pieces for dissolution. The resultant polymer had an approximate composition of 6.0 mol % SSIPA, 1.0 mol % MA, 46.5% IPA, and 46.5 mol % TA on an acid moieties basis; and 30 mol % NPG and 70 mol % EG on a diols basis.

Preparation of SulfoPET 2 Resin Solution 726.4 grams of SulfoPET 2, 726.4 grams of isopropanol, and 2905.6 grams of water were added at room temperature (about 22° C.) to a 2-gallon (7.57-liter) stainless-steel reactor. The reactor was heated to 88° C. and held at this temperature for 90 minutes. The batch was then heated to 94° C. and held at temperature until the isopropanol was driven off through a separation column. The reactor was then drained, and the resultant material was a 20 wt. % solids aqueous dispersion containing the SulfoPET 2.

Preparation of SulfoPET 2 Primer Formulation

Into a 113-mL glass jar, the following components were added, and then stirred for 5 minutes: 7 grams of SulfoPET 2 Resin Solution, 1 gram non-ionic surfactant ("TOMADOL 25-9") (added as a 10 wt. % dilution in DI water), 41.0 grams DI water, 0.5 gram glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram melamine formaldehyde resin ("CYMEL 327"), and 0.1 gram para toluene sulfonic acid catalyst, amine blocked ("CYCAT 4045") (added as a 10 wt. % dilution in DI water). This mixture was stirred for 3 minutes and the coating solution was then ready for coating.

Example 3

Preparation of SulfoPEN 1 Resin

To a stainless-steel 2-gallon (7.57-liter) reactor, the following components were added: 1635.4 grams of EG, 437.5 grams of NPG, 3326 grams of dimethyl-2,6-naphthalene dicarboxylate (NDC), 143.1 grams of trimesic acid, 288.2 grams of dimethyl sodiumsulfoisophthalate (DMSSIP), 0.19 gram of calcium acetate, 0.19 gram of cobalt acetate, 1.88 gram of sodium acetate (SA), and 0.19 gram of tetrabutyl titanate (TT).

Once added, these materials underwent a typical polyester polymerization process as described above for SulfoPET 1 resin preparation. The reactor was drained, and the reaction product resin was cooled to room temperature (about 22° C.). Then the resin was ground up into small pieces for dissolution. The resultant polymer had an approximate composition of 6.4 mol % DMSSIP, 4.5 mol % trimesic acid and 89.2 mol % NDC on an acid/ester moieties basis; and 27.5 mol % NPG and 72.5 mol % EG on a diols basis.

Preparation of SulfoPEN 1 Resin Solution 726.4 grams of SulfoPEN 1, 726.4 g of isopropanol and 2905.6 grams of water were added to a room temperature (about 22° C.), 2-gallon (7.57-liter) stainless steel reactor. The reactor was heated to 88° C. and held at this temperature for 90 minutes. The batch was then heated to 94° C. and held at temperature until the isopropanol was driven off through a separation column. The reactor was then drained, and the resultant material was a 20 wt. % solids aqueous dispersion containing the SulfoPEN 1.

Preparation of SulfoPEN 1 Primer Formulation

Into a 113-milliliter glass jar, the following components were added and stirred for 5 minutes: 7 grams SulfoPEN 1 Resin Solution, 1 gram non-ionic surfactant ("TOMADOL 25-9") (added as a 10 wt. % dilution in DI water), 41.0 grams DI water, and 0.5 gram glycidoxypropyltrimethoxy (epoxy functional) silane ("SILQUEST A-187"). Then the following components were added: 0.3 gram of aqueous dispersion of hydrophilic fumed silica ("Aerodisp W 1226"), 0.3 gram melamine formaldehyde resin ("CYMEL 327"), and 0.1 gram para toluene sulfonic acid catalyst, amine blocked ("CYCAT 4045") (added as a 10 wt. % dilution in DI water). This mixture was stirred for 3 minutes and the coating solution was then ready for coating.

Example 4

Preparation of SulfoPET 3 Resin

To a stainless-steel 2-gallon (7.57-liter) reactor at room temperature (about 22° C.), equipped with electrical heating, an overhead separation column, and a vacuum pump, the following components were added: 2152 grams of EG, 575.7 grams of NPG, 1222 grams of TA, 128.8 grams of trimesic acid, 1509.6 grams of adipic acid, 329.6 grams of sebacic acid, 350.5 g of SSIPA, 0.09 gram of calcium acetate, 0.09 gram of cobalt acetate, 0.85 gram of SA, and 0.09 gram of TT. Once added, these materials underwent a typical polyester polymerization process as described in SulfoPET 1 resin preparation above. The reactor was drained, and the reaction product resin was cooled to room temperature (about 22° C.). Then the resin was ground up into small pieces for further dissolution. The resultant polymer had an approximate composition of 6.5 mol % SSIPA, 8.1 mol % sebacic acid, 45.7% adipic acid, 3.1 wt. % trimesic acid and 36.6% TA on an acid moieties basis; and 27.5 mol % NPG and 72.5 mol % EG on a diols basis.

Preparation of SulfoPET 3 Resin Solution 726.4 grams of the SulfoPET 3,726.4 grams of isopropanol, and 2905.6 grams of water were added at room temperature (about 22° C.) to a 2-gallon (7.57-liter) stainless-steel reactor. The reactor was heated to 88° C. and held at this temperature for 90 minutes. The batch was then heated to 94° C. and held at temperature until the isopropanol was driven off through a separation column. The reactor was then drained, and the resultant material is a 20 wt. % solids aqueous dispersion containing the SulfoPET 3.

Preparation of SulfoPET 3 Primer Formulation

Into a 113-mL jar, the following components were added and then stirred 1 minute: 7 grams of SulfoPET 3 Resin Solution, 1 gram of non-ionic surfactant ("TOMADOL 25-9") (as a 10 wt. % dilution in DI water), 41 grams DI water, and 0.5 gram glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram of para toluene sulfonic acid catalyst, amine blocked ("CYCAT 4045") (as a 10 wt. % dilution in DI water). This mixture was stirred for 3 minutes and the coating solution was then ready for coating.

Example 5

Preparation of SulfoPET 2 Primer Formulation with Sulfonated Polyester Aqueous Dispersion Containing 33 wt. % Polymer Solids ("EASTEK 1100")

Into a 113 mL glass jar, the following components were added and then stirred for 5 minutes: 3.5 grams of SulfoPET 2 Resin Solution, 2.1 grams of sulfonated polyester aqueous dispersion containing 33 wt. % polymer solids ("EASTEK 1100"), 1 gram non-ionic surfactant ("TOMADOL 25-9") (as a 10 wt. % dilution in DI water), 41 grams of DI water, and 0.5 gram of glycidoxypropyltrimethoxy (epoxy functional) silane ("SILQUEST A-187"). Then the following components were added: 0.3 gram of aqueous dispersion of hydrophilic fumed silica "AERODISP W 1226"), 0.3 gram of melamine formaldehyde resin ("CYMEL 327"), and 0.1 gram of para toluene sulfonic acid catalyst, amine blocked ("CYCAT 4045") (added as a 10 wt. % dilution in DI water). The mixture was stirred for 3 minutes and the coating solution was then ready for coating.

Example 6

Preparation of SulfoPEN 1 Primer Formulation with Sulfonated Polyester Aqueous Dispersion Containing 33 wt. % Polymer Solids ("EASTEK 1100")

Into a 113 mL glass jar, the following components were added and then stirred for 5 minutes: 3.5 grams of SulfoPEN 1 Resin Solution, 2.1 grams of glycidoxypropyltrimethoxy (epoxy functional) silane ("EASTEK 1100"), 1 gram of non-ionic surfactant ("TOMADOL 25-9") (as a 10 wt. % dilution in DI water), 41 grams of DI water and 0.5 gram of Glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram para toluene sulfonic acid catalyst, amine blocked ("CYCAT 4045") (added as a 10% dilution in DI water). The mixture was stirred for an additional 3 minutes and the coating solution was then ready for coating.

Preparation of Oriented Films Coated with the Primer Formulations of Examples 1-6

Primer Formulations were coated onto non-oriented, cast PET film of thickness ranging from 250-650 mm, using a coating rod (obtained under the trade designation "MAYER ROD, NO. 6" from RDS Specialties, Webster, NY). The samples were dried in a lab batch electric oven (obtained under the trade designation "PROTOCOL PLUS" from Despatch Industries, Minneapolis, MN) for 3 minutes at 80° C. Samples were then loaded into a lab scale batch film stretching machine (obtained under the trade designation "KARO IV" from Bruckner Maschinenbau GmbH & Co. KG, Siegsdorf, Germany). The samples were pre-heated at 98° C. for 45 seconds, then simultaneously stretched to 4 times the unstretched dimension in the transverse direction and 1.5 times the unstretched dimension in the machine direction, followed by heating for 15 seconds at 215° C. to 225° C. The resultant films were converted to 12.7 cm by 25.4 cm sheets for subsequent testing.

Preparation of Release Liners of Examples 1-6

Primer coated stretch-oriented polyester films were coated with a silicone release formulation which is a mixture of a VTSP, and HFSX. VTSP (100 parts by wt.) and HFSX (2.54 parts by wt.) were mixed, yielding a hydride:vinyl ratio of 1.2:1, and the mixture was stirred to give a homogeneous solution. The 12.7 cm by 25.4 cm sheet samples were taped one after another onto a roll of 2 mil (51 micrometers) PET carrier film (which was an uncoated, biaxially oriented PET homopolymer film) so that continuous coating equipment could be employed. The silicone release formulation was coated onto the primed side of the test films made as above, using a gravure coater with a 200 QCH pattern gravure roll at a line speed of 90 ft./min. (27.4 m/min), and was then dried and cured in an in-line oven set at 121° C. with a residence time of 20 seconds.

Silicone Anchorage Test

Roll samples of each silicone coated liner were stored under Constant Temperature and Humidity Room (CTH) condition (23° C., 50% RH) for 3 days. A separate set of letter-sized samples, each bearing one of the 12.7 cm by 25.4 cm test samples, were cut from each roll and hung vertically in a sealed chamber (23° C., 98% RH) for 7 days. To test the anchorage, a piece of silicone rubber was rubbed 5 times back and forth over the silicone coated side of the samples described above. The anchorage test is recorded as a "pass" if no visible amount of silicone was rubbed away from the surface. Films of Examples 1-6 each passed this test in both variations.

Preparation of PSA Coated Films of Examples 1-6

Onto the silicone coated films, coatings of adhesive were prepared as described in Example 1, col. 14 lines 35-60, of U.S. Pat. No. 8,911,873 B2 (Suwa et al.), the disclosure of which is incorporated herein by reference, except that the primed and silicone coated films of these Examples were used as substrate films instead of the substrate films ("CERAPEEL"), the adhesive was notch bar coated to 130-170 micrometers thick, and the over-laminated release film was a release liner (obtained under the trade designation "RF 22N" from SKC Haas, Seoul, Korea) rather than the films obtained under the trade designation "PUR EX A-31."

Extractables Test

Extractables (expressed as % Extractables) is measured with an X-ray fluorescence detector (obtained under the trade designation "OXFORD 8000 XRF" from Oxford Instruments, Bristol, United Kingdom). % Extractables is a measurement of the silicone coating weight difference of a silicone coated film sample disk before and after extraction with methyl isobutyl ketone (MIBK). The silicone coating weight of a sample disk was inferred via the XRF instrument before extraction in solvent, then the same sample was put into a 100 mL glass jar with 25 grams of MIBK, sealed, and put on a roller mill that was gently agitated for 30 minutes. The sample disk was removed and allowed to evaporate dry in air for 10 minutes, coating side up. The extracted sample was remeasured in the XRF instrument as before. % Extractables were calculated as the change in the silicone levels after extraction. Most desirable values are not greater than 5% Extractables.

Rub Off Test

The Rub Off Test is the measure of the amount of silicone coating removed from a silicone coated sample after it was rubbed with a steel wool pad on an abrasion test instrument (obtained under the trade designation "TABER 5800 HEAVY DUTY LINEAR ABRADER" from Taber Industries, North Tonawanda, NY).

The coating weight of the silicone on the unabraded sample (Sample A) was measured using the X-ray fluorescence detector ("OXFORD 8000 XRF") as described above for the Extractables Test. This was recorded as the unrubbed (Sample A) % silicone. Another sample strip was cut adjacent to the first sample and mounted onto the abrasion test instrument ("TABER 5800 HEAVY DUTY LINEAR ABRADER") test bed using adhesive tape (obtained under the trade designation "SCOTCH 851" from 3M Company, St. Paul, MN), sticky side up. The sample strip of silicone coating was mounted onto the tape to hold it in place during testing. A fresh steel wool pad was mounted on the foot of the abrasion test instrument and the foot is lowered onto the silicone side of the test sample. The test foot is weighted to 1000 grams for testing. Once lowered, the foot is rubbed back and forth 5 times over the silicone sample, which is now called the rubbed sample (Sample B). Sample B is then measured using the X-ray fluorescence detector as described above. This measurement is recorded as rubbed (Sample B). The results are reported as % Rub Off, calculated as follows, % Rub Off=[1−(Sample $B$ silicone weight)/(Sample $A$ silicone weight)]×100%

Three different sets (representing different conditioning protocols) of three silicone samples each, are measured for each coating, and % Rub Off is reported as the average result of the 3 test samples for each conditioning protocol. One set is measured immediately after coating, and the result is called Initial % Rub Off, another set of samples are placed in a Constant Temperature and Humidity Room (CTH), at 21° C. and 70% Relative Humidity (RH) for 7 days, prior to measuring % Rub Off. A third set of samples are placed in a 90/90 Environment: 90° F. (32° C.) and 90% RH for 7 days before being tested for % Rub Off.

For % Rub Off, a desirable % Rub Off is considered anything below 50%.

Liner Peel Procedure and Visual Whitening Test

Although not wanting to be bound by theory, it is believed that in commercial use as a delivery system for adhesives, the laminated articles made above would have the non-exemplary release film peeled off, the exposed adhesive would be applied to a surface such as an optical display part, and the Exemplary liner would then be peeled off, leaving the adhesive on the optical display part. To simulate this process, so as to be able to measure the haze and degree of whitening in commercial use of the exemplary liners of Examples 1-6 a controlled 180-degree peel was performed on the laminated articles. A peel tester (obtained under the trade designation "SP 2100" from Imass, Accord, MA) equipped with a 5.0 lbs. (2.27 kg) load cell was operated with the following parameters: a 1 inch (2.54 cm) wide test specimen, a peel rate of 90 in./min. (229 cm/min.), a one second delay before data acquisition, and a five second averaging time. The load cell was tared before starting a peel. Double sided masking tape (obtained under the trade designation "3M 410M," 3M Company, St. Paul, MN) was used to adhere a sample made above, with the silicone liner side up, to platen, and the primed silicone liner was attached to the peel arm. Then the platen was "Jogged" until the liner was taut and then the peel was begun.

Visual appearance was rated for whitening based on a visual rating scale from 1 to 3, where a 1 represented significant whitening, a 2 represented slight whitening, and a 3 represented no whitening. The most desirable rating is the 3 rating (i.e., no whitening of the liner after its peeling-mode removal from the PSA).

Test results for the visual whitening of Examples 1-6 are shown in Table 2, below.

TABLE 2

| Example | Polymer 1 | Polymer 2 | Ratio Polymer 1/ Polymer 2 | % Extractables | Initial % Ruboff | 7-day 21° C./70% RH % Ruboff | 7-day 32° C./90% RH % Ruboff | Whitening Test Rating |
|---|---|---|---|---|---|---|---|---|
| 1 | SulfoPET 1 | "EASTEK 1100" | 50/50 | 0.2 | 45.3 | 48.9 | 47.7 | 1 |
| 2 | SulfoPET 2 | NA | 100/0 | 0.2 | 57.1 | 40.3 | 51.4 | 1 |
| 3 | SulfoPEN 1 | NA | 100/0 | 0.1 | 39.7 | 49.9 | 44.1 | 3 |
| 4 | SulfoPET 3 | NA | 100/0 | 0.2 | 37.1 | 45.7 | 34.2 | 3 |
| 5 | SulfoPET 2 | "EASTEK 1100" | 50/50 | 0.3 | 21.5 | 21.4 | 16.7 | 1 |
| 6 | SulfoPEN 1 | "EASTEK 1100" | 50/50 | 0.3 | 29.3 | 22.6 | 20.1 | 3 |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An uncured aqueous composition comprising surfactant and a blend of (a) a first sulfonated polyester having a glass transition temperature not greater than 75° C. that is not sulfonated polyethylene naphthalate, (b) a second sulfonated polyester that is a sulfonated polyethylene naphthalate, (c) melamine-formaldehyde crosslinker, and (d) an epoxy silane coupling agent.

2. The uncured aqueous composition of claim 1, wherein at least one of the sulfonated polyester or sulfonated polyethylene naphthalate independently comprises an oxyalkylene (OR) having a carbon chain length of at least 2 carbon atoms.

3. The uncured aqueous composition of claim 1, wherein at least one of the first sulfonated polyester or the sulfonated polyethylene naphthalate independently have the formula:

wherein n is at least 10, and wherein at least some R' comprise arylenesulfonate.

4. The uncured aqueous composition of claim 3, wherein the arylenesulfonate comprises a phenylenesulfonate.

5. The uncured aqueous composition of claim 3, the arylenesulfonate comprises at least one of lithium arylenesulfonate, sodium arylenesulfonate, potassium arylenesulfonate, calcium arylenesulfonate, beryllium arylenesulfonate, a zinc arylenesulfonate, a zirconium arylenesulfonate, a vanadium arylenesulfonate, copper arylenesulfonate, or aluminum arylenesulfonate.

6. The uncured aqueous composition of claim 1, wherein the first sulfonated polyester is present in a range from greater than zero to 50 weight percent, based the total solids content of the aqueous composition, and wherein the sulfonated polyethylene naphthalate is present in a range from greater than zero to 40 weight percent, based the total solids content of the aqueous composition.

7. The uncured aqueous composition of claim 1, wherein the melamine-formaldehyde crosslinker comprises a partially alkoxymethylated melamine formaldehyde resin, and wherein the melamine-formaldehyde crosslinker is present in a range from greater than 0 to 20 weight percent, based the total solids content of the aqueous composition.

8. A cured composition obtained by curing the uncured aqueous composition of claim 1.

9. An article comprising, in order:
a first polymeric film having first and second, opposed major surfaces,
a first layer having first and second, opposed major surfaces on the first major surface of the first polymeric layer, the first layer comprising the cured composition of claim 8; and
a first release layer having first and second, opposed major surfaces on the first major surface of the first layer.

10. The article of any claim 9, wherein the first release layer is a silicone release layer.

11. The article of claim 9, further comprising a second layer having first and second, opposed major surfaces on the second major surface of the first polymeric film.

12. The article of claim 11, wherein the second layer provided by curing a composition comprising surfactant and a blend of (a) a first sulfonated polyester having a glass transition temperature not greater than 75° C. that is not sulfonated polyethylene naphthalate, (b) a second sulfonated polyester that is a sulfonated polyethylene naphthalate, (c) melamine-formaldehyde crosslinker, and (d) an epoxy silane coupling agent.

13. The article of claim 11, further comprising a second release layer having first and second, opposed major surfaces on the second major surface of the second layer.

14. The article of claim 13, wherein the second release layer is a silicone release layer.

* * * * *